United States Patent
Wang et al.

(10) Patent No.: US 9,921,088 B2
(45) Date of Patent: Mar. 20, 2018

(54) DEVICE FOR DETERMINING TEMPERATURE AS WELL AS MEASURING ARRANGEMENT FOR DETERMINING FLOW

(71) Applicant: Krohne AG, Basel (CH)

(72) Inventors: Tao Wang, Rough Common (GB); Neil Harrison, Duston (GB)

(73) Assignee: Krohne AG, Basel (CH)

( * ) Notice: Subject to any disclaimer, the term of this patent is extended or adjusted under 35 U.S.C. 154(b) by 75 days.

(21) Appl. No.: 14/921,216

(22) Filed: Oct. 23, 2015

(65) Prior Publication Data
US 2016/0138952 A1   May 19, 2016

(30) Foreign Application Priority Data
Nov. 14, 2014 (DE) .................. 10 2014 116 658

(51) Int. Cl.
| G01F 1/68 | (2006.01) |
| G01F 1/684 | (2006.01) |
| G01K 7/16 | (2006.01) |
| G01K 1/14 | (2006.01) |
| G01F 1/86 | (2006.01) |
| G01F 1/84 | (2006.01) |

(52) U.S. Cl.
CPC ........... *G01F 1/6847* (2013.01); *G01K 1/143* (2013.01); *G01K 7/16* (2013.01); *G01F 1/8409* (2013.01); *G01F 1/86* (2013.01); *G01K 2007/163* (2013.01)

(58) Field of Classification Search
CPC ........... G01K 1/08; G01K 1/14; G01K 1/143; G01K 7/16; G01K 2007/163; G01F 1/68; G01F 1/684; G01F 1/6847; G01F 1/86
USPC ............... 73/204.11, 204.22, 204.23, 204.25
See application file for complete search history.

(56) References Cited

U.S. PATENT DOCUMENTS

| 2,729,976 A * | 1/1956 | Laub ...................... G01F 1/6847 73/204.16 |
| 4,971,452 A * | 11/1990 | Finney ................... G01K 1/143 338/28 |
| 5,831,697 A | 11/1998 | Evanicky et al. |
| 2001/0053172 A1 * | 12/2001 | Sakowsky ............... G01K 1/143 374/147 |
| 2004/0067002 A1 * | 4/2004 | Berg ....................... G01V 11/00 385/12 |

FOREIGN PATENT DOCUMENTS

| DE | 44 27 181 A1 | 2/1996 |
| DE | 202 08 698 U1 | 9/2002 |
| DE | 10 2006 003 602 B4 | 10/2008 |
| DE | 20 2013 005 207 U1 | 10/2014 |

\* cited by examiner

*Primary Examiner* — Benjamin Schmitt
(74) *Attorney, Agent, or Firm* — David S. Safran

(57) ABSTRACT

A device (1) for determining temperature and a measuring arrangement for determining flow that allows for a secure attachment on an object. The device has a measuring element (2) with a temperature-dependent electric resistance value. The measuring element (2) is surrounded by a thermally conductive fixing element (5) and is encompassed by a retaining bracket (6).

8 Claims, 4 Drawing Sheets

DEVICE FOR DETERMINING TEMPERATURE AS WELL AS MEASURING ARRANGEMENT FOR DETERMINING FLOW

BACKGROUND OF THE INVENTION

Field of the Invention

The invention relates to a device for determining temperature. Furthermore, the invention relates to a measuring arrangement for determining the flow of a medium through at least one measuring tube. The measuring arrangement is, for example, a Coriolis or a vortex flowmeter. The medium is, in particular, flowable and preferably at least partially a liquid or a gas.

Description of Related Art

A flowmeter using the Coriolis principle can be seen in U.S. Pat. No. 5,831,697. There, temperature sensors are attached to the measuring tube in order to increase the measuring accuracy.

A problem that often occurs when using temperature sensors—or in general devices for determining temperature—is being able to attach or reliably attach the sensors to the measuring object. This occurs, in particular, for uses subject to harsh surrounding conditions. For example, very high or very low temperatures or jumps in temperature can damage the attachment. Machines such as stirrers, pumps, etc. also exert forces on the sensors to some extent.

Principally, there is an increased risk that the sensors or devices become detached. Additionally, the contact between the measuring object and the sensor can change over time, which can lead to less reliable measurements.

SUMMARY OF THE INVENTION

Thus, the object of the invention is to provide a device for determining temperature that allows for a secure as possible attachment onto an object.

The device for determining temperature according to the invention, in which the above described and derived object is achieved, is initially and essentially wherein at least one measuring element with a temperature-dependent electric resistance value is provided. The measuring element is at least partially surrounded by a thermally conductive fixing element thereby. Furthermore, the measuring element is at least partially encompassed by a retaining bracket.

The measuring element is used for the actual temperature determination and has, in particular, a temperature-dependent resistance value so that—in particular, by using stored data—the prevailing temperature can be inferred from the electric resistance.

In one design, the measuring element is, in particular, a type of resistance thermometer (or RTD for resistance temperature device) having a positive or negative temperature coefficient. The measuring resistance consists, thereby, of platinum or of a ceramic.

The measuring element is surrounded—at least partially or essentially completely—by a thermally conductive fixing element.

The fixing element is, in one design, in particular, very temperature-resistant, e.g., withstanding temperatures between +300° C. and −200° C.

The fixing element, thereby, is designed essentially as a compound in one design and essentially as an adhesive in an alternative design. The fixing element consists, for example, of a so-called heat transfer compound. In a further design, the fixing element is an injection-molded component. In another design the fixing element is a het transfer compound, especially a cement.

In one design, the measuring element is embedded in the fixing element.

The arrangement made of the measuring element and fixing element is additionally at least partially encompassed by a retaining bracket.

In one design, the retaining bracket is designed essentially in strips. Preferably, the width of the strip is thereby dimensioned so that the measuring element is at least partially or completely covered. The retaining bracket, thereby, in one design, is thin in comparison to its other dimensions.

The retaining bracket, in one design, has an arched or half-barrel shaped silhouette. In an alternative design, the retaining bracket has a step or terrace shaped form.

In particular, the retaining bracket makes possible an enlargement of the fixing or supporting surface of the device for determining temperature. Furthermore, the retaining bracket also allows for other types of attachment (e.g., soldering or welding), which preferably are not used on the measuring element itself. Additionally, different types of attachment can also be combined for the measuring element, which possibly complement one another.

In one design, the retaining bracket is formed at least partially or essentially completely of a metal.

The retaining bracket, in one design, at least partially encompasses the measuring element and additionally—at least partially—the fixing element. In this design, the measuring element is surrounded by the fixing element and the measuring element and the fixing element are partially encompassed by the retaining bracket.

In one design, the fixing element is directly connected to the retaining bracket or, respectively, is in close contact with it.

If the retaining bracket is made of metal, then, in one design, a thermally conductive connection exists between the retaining bracket and the fixing element.

In one variation, the measuring element is essentially completely surrounded by the fixing element or is embedded in it and the retaining bracket covers at least three sides of the fixing element or this measuring element located therein. The retaining bracket thus encircles the measuring element or, respectively, the fixing element.

For electric contact or for determining the electric resistance of the measuring element, the measuring element has at least two electric contacts, in one design.

At least one electric cable (e.g., in the form of a wire or cable) per contact is connected to each of these two contacts in one design.

The temperature, to which the measuring element is exposed, is determined by using the two cables for respective measurements of the electric resistance value of the measuring element and by using respective evaluation.

If the two cables are identified, for example, as 1 and 2, and if the electric resistance R12 is measured between the two cables, then a value for the temperature T results from a—respectively pre-determined—function f for the dependency of the resistance on the temperature: T=f(R12).

In order to improve the temperature measurement, at least one contact of the measuring element is connected to at least two electric cables in one design.

For clarification, if the three cables are identified as 1, 2, and 3, wherein cables 2 and 3 are connected to the same contact. The electric resistance R12 between the cables 1 and 2 and the resistance R23 between the cables 2 and 3 are measured. Thus, the temperature T is given by the function f, which describes the interrelation between the resistance of the measuring element and the temperature: $T=f(R12-R23)$.

The following design addresses the attachment of the cables.

An auxiliary retaining bracket designed essentially like the retaining bracket is provided hereby. Additionally, a thermally conductive auxiliary fixing element designed essentially like the fixing element is also provided.

In one design, the retaining bracket and the auxiliary retaining bracket are designed essentially identically. Likewise, the fixing element and the auxiliary fixing element are designed identically in one design.

The auxiliary retaining bracket and the auxiliary fixing element at least partially surround at least one of the cables that are connected to one of the two contacts of the measuring element. In this design, the cables are thus attached like the measuring element and this, preferably with respectively designed components.

In one design, an adhesive element is provided for attaching the device, so that attachment occurs by means of adhesive.

For this, in one design, the measuring element is arranged between the retaining bracket and the adhesive element. In this design, thus, the measuring element is at least partially embedded in the fixing element and is at least partially surrounded by the retaining bracket and partially by the adhesive element.

In one design, the retaining bracket ends at the adhesive element, so that the retaining bracket is attached to the adhesive element and the device is pasted onto the subsurface via the adhesive element.

In an alternative design, the device is attached via the adhesive element by means of adhesion and via the retaining element by means of another attachment method, e.g., by means of soldering or welding.

In an alternative design, the fixing element is designed as an adhesive element, so that the fixing element and the adhesive element coincide in one component. The measuring element is thus at least partially embedded in a thermally conductive adhesive material in this design.

In order to increase the measuring accuracy or in order to make a space-resolved measuring of temperature possible, at least two measuring elements are provided in one design.

Preferably, both measuring elements are designed principally identically.

In particular, each of the measuring elements has two electric contacts and, in one design, each of these electric contacts is connected to at least one cable.

Thus, in one design, there are a total of at least four cables.

For example, if the cables are identified as 1, 2, 3, and 4, wherein cables 1 and 2 belong to a first measuring element and the cables 3 and 4 belong to a second measuring element. The resistances R12 for the first measuring element and R34 for the second measuring element are measured thereby. Insofar as the same functional correlation f between resistance value and temperature exists for both measuring elements, the temperature can be determined using: $T=(f(R12)+f(R34))/2$.

If different measuring elements are used, then their individual functions should be used here.

The difference $\Delta T$ between both temperature values $f(R12)$ and $f(R34)$: $\Delta T=(f(R12)-f(R34))$ is a measure for the reliability of the temperature measurement. Thus, in one design, an alarm is triggered when the difference $\Delta T$ exceeds a predetermined tolerance.

Furthermore, in one design, one cable of one of the two measuring elements is connected in an electrically conductive manner to at least one cable of the other measuring element. Two cables from two different measuring elements are thus in electric contact with one another in this design.

For example, if the four cables are again identified as 1, 2, 3, and 4, wherein the cables 1 and 2 belong to the first measuring element and the cables 3 and 4 belong to the second measuring element and wherein the cables 2 and 4 are connected to one another. The resistance values R12 and R34 for the measuring elements as well as the resistance value R24 for the connected cables are measured.

Again, the same functional correlation f is given thereby for the two measuring elements. The temperature T then results using:

$$T=(f(R12-R24)+f(R34-R24))/2.$$

The difference $\Delta T$ between both temperature values $f(R12-R24)$ and $f(R34-R24)$ is also used here for monitoring temperature measurement.

In order to increase the attachment surface, the retaining bracket is provided with two fixing surfaces in one design. In the strip-like retaining bracket, the fixing surfaces are extensions, in one design, which preferably extend away from the side of the measuring element or from the side of the fixing element.

According to a further teaching, the invention is related to a measuring arrangement for determining the flow of a medium flowing through at least one measuring tube, wherein at least one device for determining temperature according to the above designs is attached to the measuring tube.

The above explanations of the designs of the device are correspondingly also valid for the measuring arrangement.

In one design, at least two measuring tubes are provided. Furthermore, at least one device for measuring temperature is attached to each of the measuring tubes.

If a partial current of the same medium flows through both measuring tubes, then there is a possibility for increasing the measuring accuracy using the at least two devices for determining temperature (by forming an average of the measurement results), for monitoring temperature measurement (by providing a pre-determined threshold value for the difference of the two measuring temperature values) and for maintaining the measuring ability in the case of failure of a device for determining temperature.

If the devices have electric cables or if the associated measuring elements are connected to such cables, then, in one design, the cables of the device are mainly arranged on only one of the two measuring tubes.

The cables of one device or of its measuring elements are led over from the measuring tube belonging to that device to the other measuring tube and are mainly kept there or also attached. Preferably, the cables of both devices are attached together or at least close to one another on the same measuring tube.

In detail, there are many possibilities for designing and further developing the device according to the invention and the measuring arrangement according to the invention. Reference is made here to the following description of embodiments in conjunction with the accompanying drawings.

DETAILED DESCRIPTION OF THE INVENTION

Figure 1:
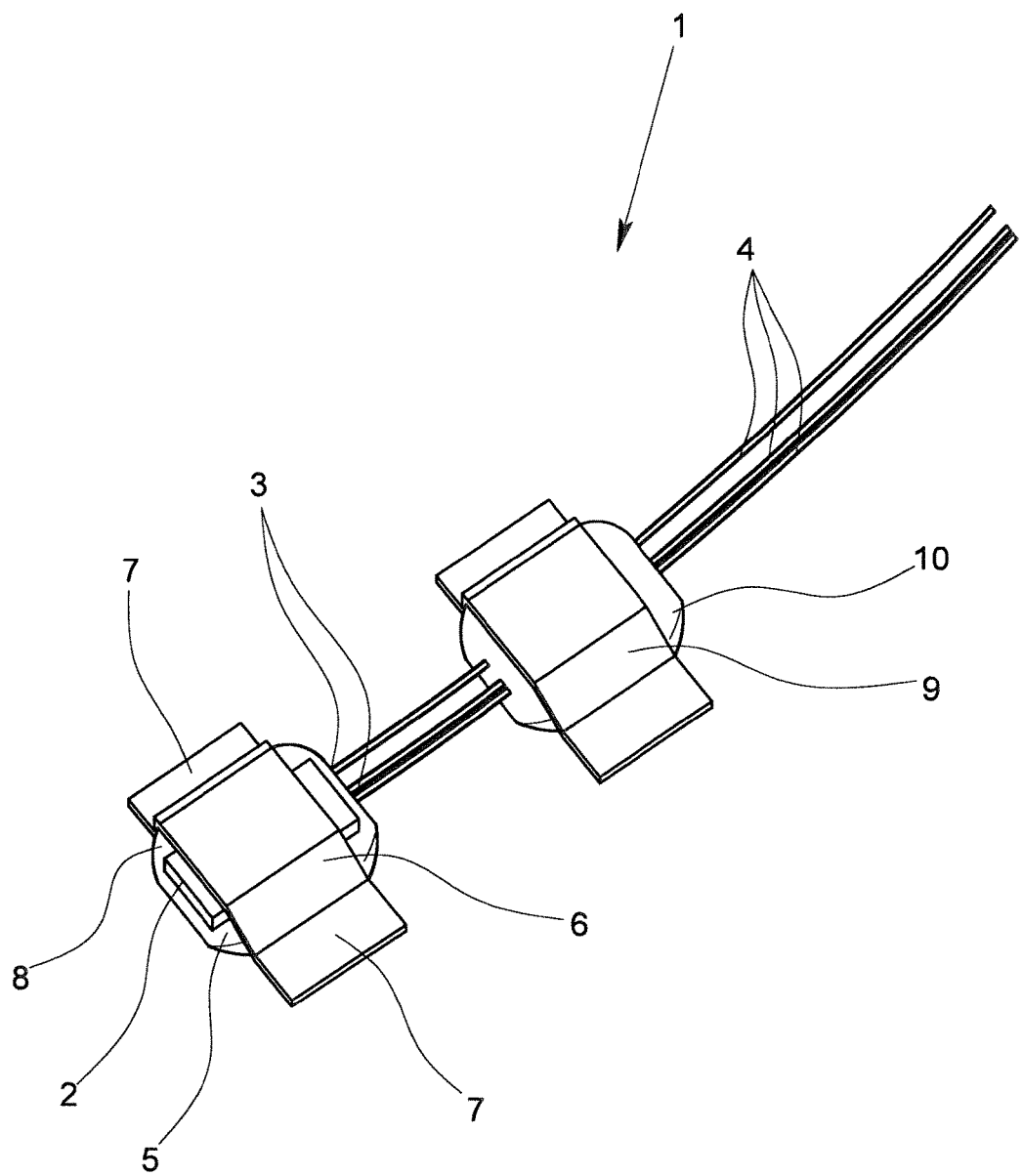
FIG. 1 is a top view of a first variation of the device for determining temperature.

A device 1 for determining temperature is shown in FIG. 1. For the actual measurement, a measuring element 2 having a temperature-dependent resistance value is provided.

In order to determine the resistance value, two electric contacts 3 are provided. In the shown variation, a total of three cables 4 are electrically connected to these contacts, which allow for the measurement of the resistance. One contact is connected to one cable and the other contact is connected to two cables.

The measuring element 2 is embedded in a thermally conductive fixing element 5. The arrangement of fixing element 5 and measuring element 2 is, in turn, surrounded by the retaining bracket 6.

Here, the retaining bracket 6 is made of a thin metal and in the shape of a strip. The strip-like retaining bracket 6 is designed in the shape of a step or terrace, wherein two fixing surfaces 7 as extensions connect to the sections of the retaining bracket 6 that are in direct contact to the fixing element 5. The fixing surfaces 7 allow for the attachment of the device 1 to a subsurface, e.g., by means of soldering or welding.

In order to attach the fixing element 5 itself, the fixing element 5 is also designed as an adhesive element 8. This can be implemented in that the fixing element 5 is made of a thermally conductive adhesive.

This attribute as adhesive element 8 thus complements the attachment of the device 1 to the corresponding measuring object using the retaining bracket 6.

An auxiliary retaining bracket 9 and an auxiliary fixing element 10 are provided for attaching the three cables 4.

Hereby, the auxiliary retaining bracket 9 is designed essentially like the retaining bracket 6 and the auxiliary fixing element 10 is designed essentially like the fixing element 5. Together, both 9, 10 are used to attach the cables 4.

Figure 2:
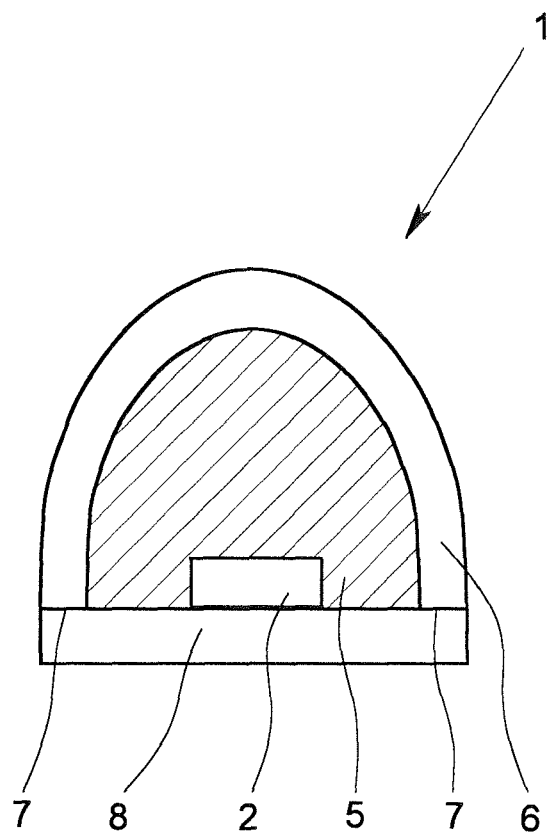
FIG. 2 is a cross-section of a second variation of the device.

FIG. 2 shows a cross-section through a schematic second variation of the device 1. The retaining bracket 6 is arch-shaped, here, and ends at an adhesive element 8 with both of its fixing surfaces 7.

In this design, the fixing element 5 is not designed as an adhesive element 8 as it is in the embodiment in FIG. 1, but rather the fixing element 5 rests on the adhesive element 8. This, in conjunction with the retaining bracket 6 ending on the adhesive element 8, leads to a compact and self-contained device 1.

It can further be seen how the fixing element 5 fully adjoins the retaining bracket 6 on its inner side.

Figure 3:
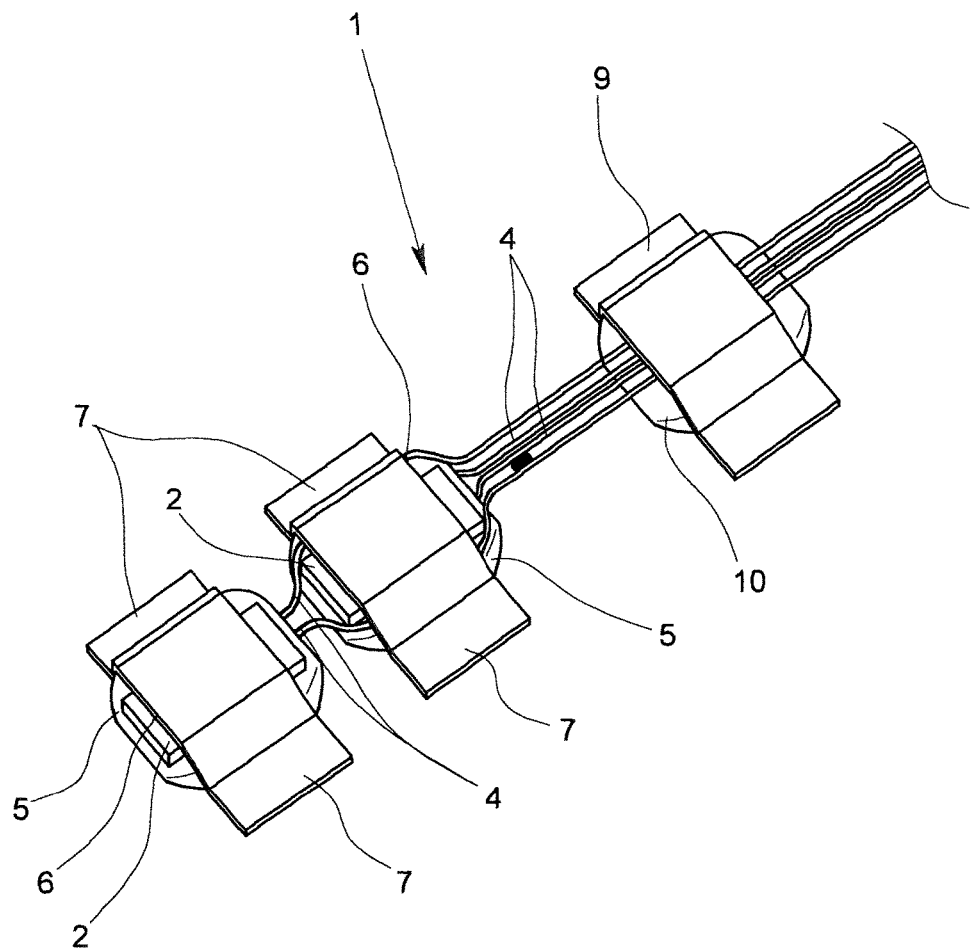
FIG. 3 is a top view of a third variation and FIG. 4 is a top view of a part of a measuring arrangement for determining flow.

A device 1 having two measuring elements 2 arranged consecutively is shown in FIG. 3.

The two cables 4 of the front measuring element 2 are led, thereby, through the fixing element 5, which surrounds the back measuring element 2. Together, a total of four cables 4 are led through and held by the auxiliary retaining bracket 9 and the auxiliary fixing element 10.

The use of two measuring elements 2 increases the measuring accuracy and allows for a mutual control of the individual results.

One of the two cables 4 of one of the measuring elements 2 is connected and in electric contact to one of the two cables 4 of the other measuring element 2. This allows for a determination of the resistance of the cables 4 and for calculation using both measuring elements 2 when determining the temperature.

Figure 4:
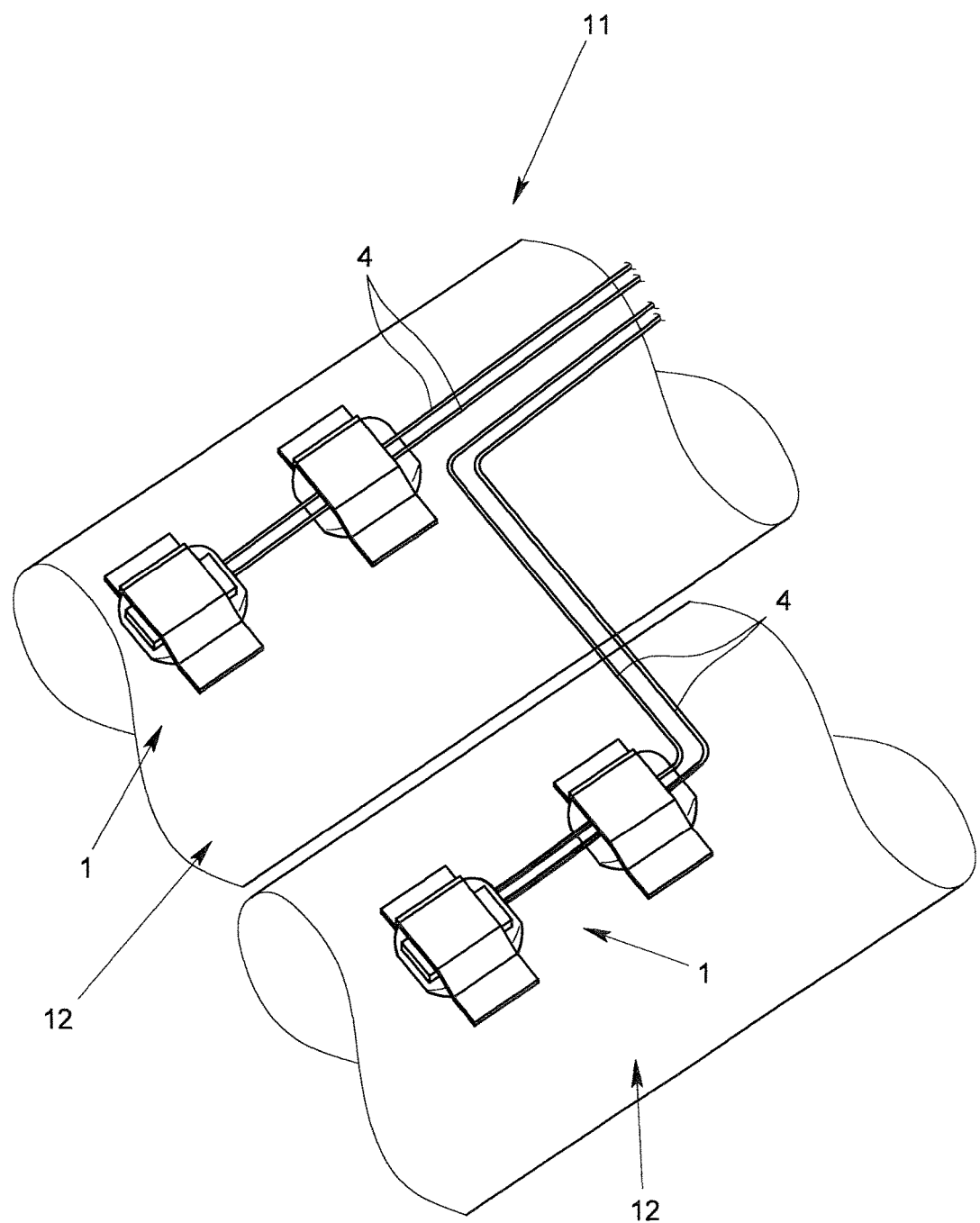

A part of the measuring arrangement 11 for determining the flow of a medium using the Coriolis principle is shown in FIG. 4. The—not shown—flowable medium flows through two measuring tubes 12 here.

A device 1 for determining temperature is attached to each measuring tube 12. As can be seen, each device 1 has only two cables 4.

The two cables 4 of the device 1 located on the right side are led to the other measuring tube 12 and are brought together with the cables 4 located there.

What is claimed is:

1. A device for determining temperature, comprising:
   at least one measuring element with a temperature-dependent electric resistance value,
   a thermally conductive fixing element at least partially surrounding the measuring element and
   a retaining bracket at least partially encompassing the measuring element,
   wherein the measuring element has at least two electric contacts and wherein each of the two contacts of the measuring element is connected to at least one electric cable and
   wherein an auxiliary retaining bracket essentially the same as the retaining bracket and a thermally conductive auxiliary fixing element essentially the same as the fixing element are provided and wherein the auxiliary retaining bracket and the auxiliary fixing element encompass, at least in sections, at least one of the cables connected to one of the two contacts of the measuring element.

2. The device according to claim 1, wherein the retaining bracket is at least partially made of metal.

3. The device according to claim 1, wherein the retaining bracket also at least partially encompasses the fixing element.

4. The device according to claim 1, wherein at least one of the contacts of the measuring element is connected to at least two electric cables.

5. The device according to claim 1, wherein the measuring element is arranged between the retaining bracket and an adhesive element.

6. The device according to claim 1, wherein the fixing element comprises an adhesive element.

7. The device according to claim 1, wherein at least two measuring elements having two contacts are provided, wherein each of the two contacts of the two measuring elements is connected to at least one electric cable and wherein at least one cable of one of the two measuring elements is electrically connected to at least one cable of the other of the two measuring elements.

8. The device according to claim 1, wherein the retaining bracket has two fixing surfaces.

* * * * *